United States Patent [19]
Kasso et al.

[11] Patent Number: 5,832,505
[45] Date of Patent: Nov. 3, 1998

[54] COMPUTER SYSTEM FOR MANAGING AND CONFIGURING APPLICATION PROPERTIES AND ENABLING SYSTEM ADMINISTRATOR TO OVERRIDE CERTAIN USER-SET OR HOST PROPERTIES

[75] Inventors: Chris S. Kasso; Joseph F. DiPol, both of Sunnyvale; Linda K. Schneider, Campbell, all of Calif.

[73] Assignee: Sun Microsystems, Inc., Palo Alto, Calif.

[21] Appl. No.: 829,891

[22] Filed: Apr. 2, 1997

[51] Int. Cl.$^6$ .................................................. G06F 15/177
[52] U.S. Cl. .............................. 707/104; 707/1; 707/100
[58] Field of Search ..................................... 707/100–104

[56] References Cited

U.S. PATENT DOCUMENTS

| | | | |
|---|---|---|---|
| 5,410,691 | 4/1995 | Taylor | 707/100 |
| 5,446,575 | 8/1995 | Lysakowski, Jr. | 707/104 |
| 5,615,372 | 3/1997 | Nishina | 395/653 |
| 5,664,117 | 9/1997 | Taylor | 395/200.5 |
| 5,680,615 | 10/1997 | Marlin et al. | 707/103 |
| 5,684,996 | 11/1997 | Westerholm et al. | 395/712 |

OTHER PUBLICATIONS

Nye, Adrian and O'Reilly, Tim, "X Toolkit Intrinsics Programming Manual", Second Edition for X11, Release 4, vol. 4, pp. 251–257 (1990).

J. Di Pol et al., "HotJava Views 1.0 System Overview and Applet Integration: A White Paper", Sun Microsystems, Inc., Mar. 1997.

*Primary Examiner*—Krisna Lim
*Attorney, Agent, or Firm*—McDermott, Will & Emery

[57] ABSTRACT

A method, apparatus, and computer program product for managing and configuring program properties of an application program by loading properties from several lists, applying a set of precedence rules to resolve conflicts among properties, and applying the properties to the application program. Properties are listed in a plurality of lists including a list of default property values, a list of host-specific property values, a list of user-specific property values, a list of application-specific property values, and final properties lists. Values in the final property lists override conflicting previously loaded property values. The default properties list is loaded, as is a host-specific properties list, but only values for the then-current host are loaded. The user-specific properties list is loaded. User-defined properties override conflicting default properties. The final system-wide properties list is loaded, its values override any conflicting user-selected property, and such final properties may not be over-ridden by any user-selected property. A final host-specific property list is loaded. Values in the final host-specific property list override any conflicting properties in the host-specific properties list, and a user may not override such final properties. Values are written into a merged property list which is applied to the application program. Users may be assigned to user groups. A set of property lists can be associated with each group so that consistent property values are applied to all users within a group. Property values can be defined for specific application programs by using a default system properties list for the application program, and an overriding system properties list for the application program.

47 Claims, 6 Drawing Sheets

COMPUTER SYSTEM FOR MANAGING AND CONFIGURING APPLICATION PROPERTIES AND ENABLING SYSTEM ADMINISTRATOR TO OVERRIDE CERTAIN USER-SET OR HOST PROPERTIES

FIELD OF THE INVENTION

The present invention relates generally to computer systems, and more particularly relates to managing and configuring properties of computer program applications in a context-sensitive way.

BACKGROUND OF THE INVENTION

Modern desktop computer systems and computer software offer a myriad of settings, parameters, and properties which enable individual computer users to customize the appearance and behavior of their system and the software running on it. Individual computer users now each desire and expect to be able to configure their personal computer system, its operating system, and application programs running on it to suit their personal needs or preferences. For example, one user may prefer to use the typeface Helvetica as the default font for a certain application program, whereas another user prefers a different font.

Therefore, many currently available application programs enable a user to configure fonts and other parameters using a configuration or "preferences" feature. The preferences of a user can be specified when the user installs the program or while the program is operating, and the selected preferences are stored in a configuration file in association with the application program on the user's computer system.

When computer systems are interconnected in a network, additional problems arise. If a new computer system or "host" is added to the network, the network system administrator may wish to establish a default set of properties to relieve users of the chore of re-configuring commonly changed properties which otherwise must be individually changed for every new host. Also, in many network environments, individual users may need to use several different computer systems or "hosts" in different locations. Under these conditions, it would be ideal to have the application program properties selected by the user follow the user from host to host, and be available to the user and the application program at any host distributed across the network.

Further, the network system administrator may desire to enforce certain policies with respect to definition of properties. For example, one application program property may be the name and location of the printer to which the application program directs hard copy output. The user may desire always to print on a particular printer, whereas the system administrator wishes to require certain hosts to print on one specific printer.

In addition, the system administrator may wish to prevent certain users or groups of users from changing particular properties. For example, consider an office environment of a company that occupies multiple office buildings located near one another in a campus. The company may use a pool of receptionists who rotate from building to building on a periodic basis. To enable smoother personnel rotation, the company may desire to have all receptionists view the same computer system configuration regardless of what host they are using or what building they are working in. In addition, the company may need to change or upgrade hosts used by the receptionists from time to time. Therefore, it is desirable for the company to establish application program properties associated with the group of receptionists rather than a particular host or user. In this case, the system administrator may desire to establish properties for the receptionist group and also override any conflicting properties selected by a particular member of the group.

Prior technologies, such as the X Windows System and the Common Desktop Environment (CDE), have a facility for loading application properties from multiple sources. However, these systems have several significant disadvantages. For example, they do not enable a system administrator to override user-set properties with the assurance that a user may not thereafter change the properties again. They do not enable a system administrator to organize users into groups and set group-specific properties. They do not enable a system administrator to set properties for a specific host with the assurance that such host-specific properties will not be overridden by a user or another individual.

For all these reasons, there is a need for methods, apparatus and products which can manage and configure application program properties by deriving the properties from multiple sources and controlling the properties in a flexible way, according to predetermined precedence policies or rules which assure control by the system administrator.

There is also a need to adapt the management and configuration of application program properties to application programs and operating systems used with a new class of computers known as "network computers", "NCs" or "Net PCs." A network computer is generally defined as a computer comprising a display, input devices, CPU and support circuitry, a main random access memory (RAM), and a local area network connection, but lacking a disk drive and other expensive and complicated peripherals. NCs offer several significant advantages, namely that they are simpler to manufacture and maintain by system administrators. However, in general, many application programs and operating system programs must be loaded into the RAM using the network connection rather than a local disk drive. Thus, there is a need to provide a way to integrate and load application program properties from a variety of sources, according to pre-determined precedence policies, and enable such properties to be used by a network computer which has no local mass storage.

SUMMARY OF THE INVENTION

The invention provides a method, apparatus, and computer program product for managing and configuring program properties of an application program by loading properties from several sources, applying a set of precedence rules to resolve conflicts among properties, and applying the properties to the application program. The precedence rules assure the system administrator that designated properties will override certain user-selected or host-specific properties, and that such overriding properties cannot themselves be overridden by a user.

According to one aspect of the invention, properties are listed in a plurality of lists including a list of default properties, a list of specific properties (which may be prepared by a user), and a final properties list. Rules of precedence are used when the property files are loaded. The default properties list is loaded, then the specific properties, then the final properties. When loaded, specific property values override conflicting corresponding default property values. Similarly, final property values override conflicting corresponding specific property values. In this way, the system administrator may prepare the final properties list with the assurance that final property values may not be overridden by a user.

In another aspect of the invention, specific properties are expressed in a user-specific properties list, a host-specific properties list, and an application-specific properties list. Corresponding final properties lists are provided for the host-specific properties list and the application-specific properties list. One or more of such specific lists may be omitted depending on the needs of the environment. In this aspect, the default properties list is loaded, then the host-specific properties file. From the host-specific properties list, only properties for the then-current host are loaded. The user-specific properties list is then loaded. User-defined properties override conflicting default properties. The application-specific properties list is loaded; from it, only property values corresponding to the currently executing application program are loaded. The final system-wide properties list file is loaded. Properties in the final properties list override any conflicting user-selected property, and such final properties may not be over-ridden by any user-selected property. A final host-specific property list is loaded. Properties in the final host-specific property list override any conflicting property value from any previously loaded list, and a user may not override such final properties.

Properties are written into a merged property list that is stored in association with the then-current host. The merged property list is applied to the then-executing application program. Attributes of the application program are modified in accordance with the properties.

Users may be assigned to user groups. A set of property lists can be associated with each group. In this way, consistent properties can be applied to all users within a group.

Using the application-specific properties list, property values can be defined for specific application programs by using a default properties list for the application program, and an over-riding or "final" properties list for the application program.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method, apparatus and computer program product for managing and configuring application program properties is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

HARDWARE OVERVIEW

Figure 1:
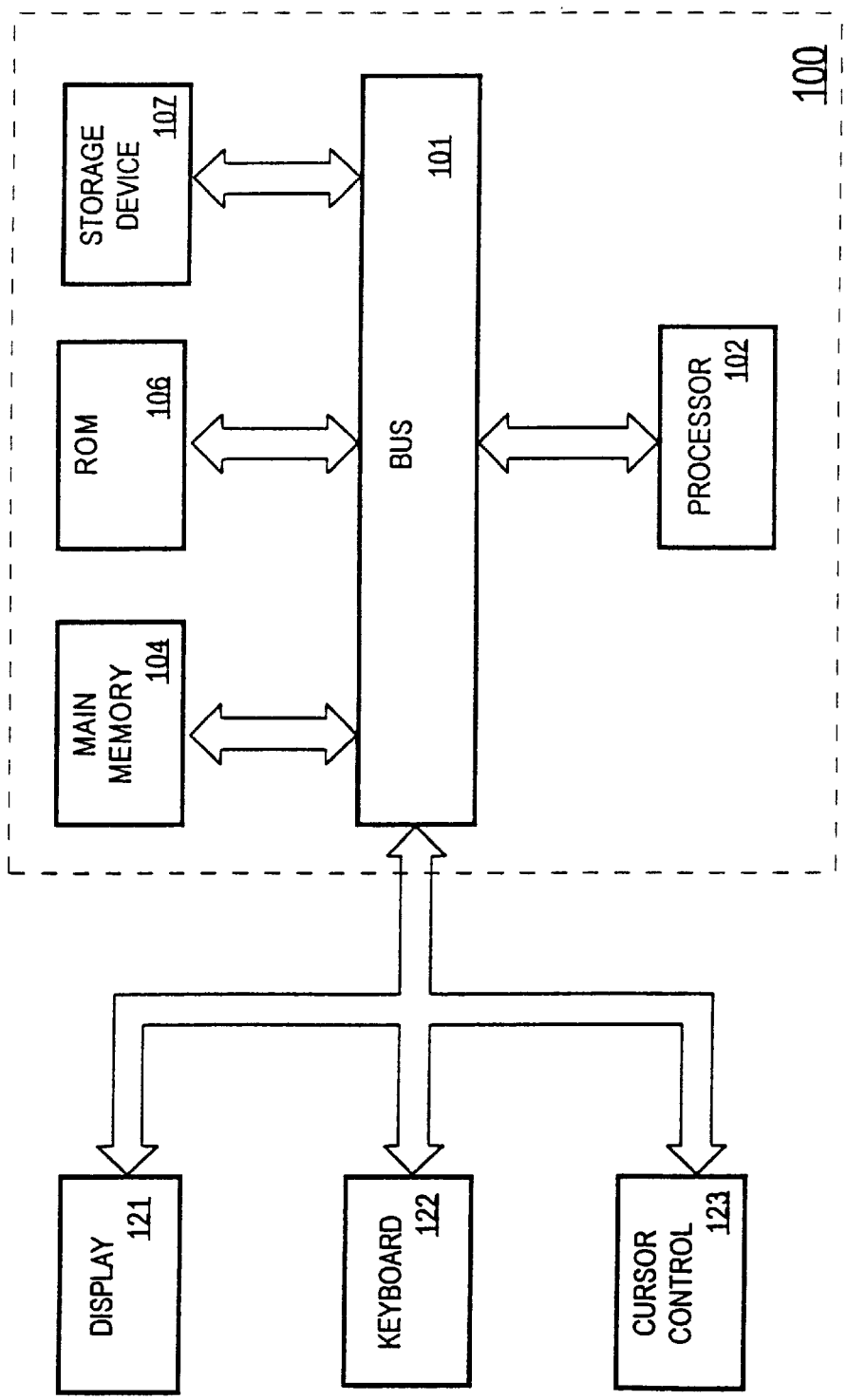
FIG. 1 is a block diagram of a computer system on which the invention may be implemented.

Referring to FIG. 1, it is a block diagram of a computer system 100 upon which an embodiment of the present invention can be implemented. Computer system 100 includes a bus 101 or other communication mechanism for communicating information, and a processor 102 coupled with bus 101 for processing information. Computer system 100 further comprises a random access memory (RAM) or other dynamic storage device 104 (referred to as main memory), coupled to bus 101 for storing information and instructions to be executed by processor 102. Main memory 104 also may be used for storing temporary variables or other intermediate information during execution of instructions by processor 102. Computer system 100 also comprises a read only memory (ROM) and/or other static storage device 106 coupled to bus 101 for storing static information and instructions for processor 102. Data storage device 107 is coupled to bus 101 for storing information and instructions.

A data storage device 107 such as a magnetic disk or optical disk and its corresponding disk drive can be coupled to computer system 100. Computer system 100 can also be coupled via bus 101 to a display device 121, such as a cathode ray tube (CRT), for displaying information to a computer user. Computer system 100 further includes a keyboard 122 and a cursor control 123, such as a mouse.

The present invention is related to the use of computer system 100 to manage and configure application program properties. According to one embodiment, the management and configuration of application program properties is performed by computer system 100 in response to processor 102 executing sequences of instructions contained in memory 104. Such instructions may be read into memory 104 from another computer-readable medium, such as data storage device 107. Execution of the sequences of instructions contained in memory 104 causes processor 102 to perform the process steps that will be described hereafter. In alternative embodiments, hard-wired circuitry may be used in place of or in combination with software instructions to implement the present invention. Thus, the present invention is not limited to any specific combination of hardware circuitry and software.

NETWORK COMPUTER ENVIRONMENT

Figure 2:
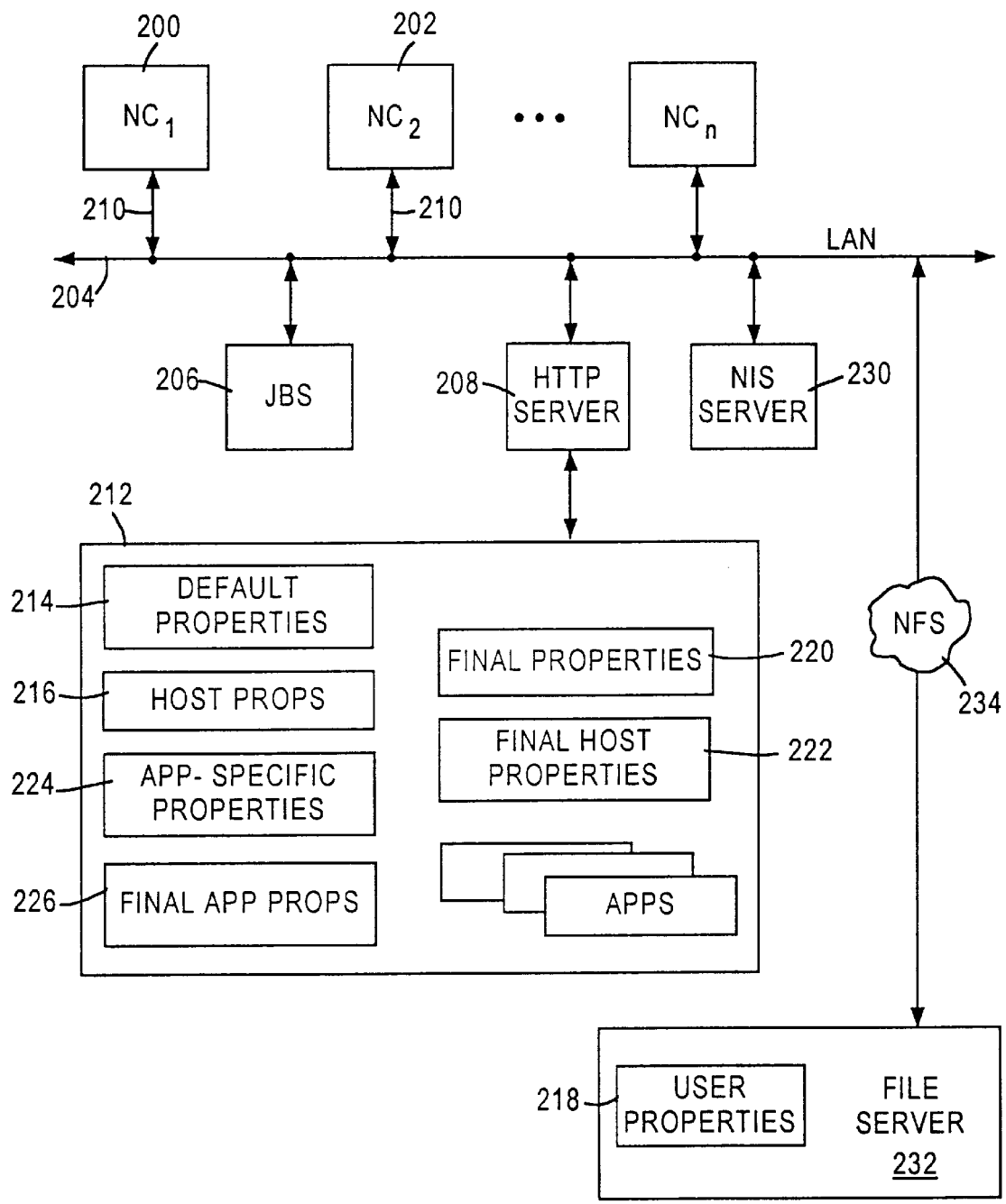
FIG. 2 is a block diagram of a networked computer environment in which the invention may be implemented.

An alternate hardware environment is shown in FIG. 2. A plurality of network computers 200, 202 each is coupled using a conventional network communication link 210 to a local area network 204. Each of the network computers may be configured in the form of computer system 100, except without data storage device 107. The term "host" is also used herein to refer to the network computers. A host is used by one or more human users.

A JavaOS boot server (JBS) 206 is also coupled to the local area network. The JBS 206 provides or distributes an operating system program, such as the JavaOS operating system available from Sun Microsystems, Inc., to a client that is logically remote from the JBS 206, such as an NC 200. This enables the NC 200, which has no local non-volatile storage device, to receive the operating system, load it, and begin executing it. An HTTP server 208 is also coupled to the local area network. The HTTP server has a mass storage device that stores documents for delivery and display by a client logically remote from the HTTP server 208, such as the NC 200. The documents stored on the HTTP server 208 can be files formatted using the Hypertext Markup Language (HTML), i.e., World Wide Web pages, or other data files such as the property lists described herein. The HTTP server executes operating system software which uses the Hypertext Transfer Protocol (HTTP) to communicate the Web pages over the local area network. A Network Information Server (NIS) 230 is coupled, locally or remotely over a wide area network (WAN) or equivalent, to local area network 204.

Other servers may be coupled to the local area network, and the network itself may be coupled or "inter-networked" to other networks. For example, a file server 232 can be coupled using a Network File System (NFS) link 234 to the local area network 204. Using methods that are well known in this art, the file server 232 can be remotely "mounted" to a client such as NC 200 under control of NFS, so that the file server 232 is available to the NC 200 as if physically attached thereto. The JBS 206 and HTTP server 208 can be inter-networked to local area network 204, or connected to a WAN or other geographically remote link.

BOOT SEQUENCE

When a user applies power to a host, such as network computer 200, the host executes a bootstrap loader routine stored in its read-only memory. During the boot procedure the host searches for the JBS 206, establishes a network connection to the JBS 206, and downloads the JavaOS operating system from the JBS 206 into the RAM of the host. The host also downloads an application program, such as Selector, available from Sun Microsystems, Inc. Selector is embedded in the boot image which is loaded from the JBS 206 into the host. The boot image also includes other parameters that enable the host to begin operating, for example, the Uniform Resource Locator (URL) of a startup or initial Web page.

The host then begins executing JavaOS. JavaOS next displays a login screen requesting a user to log in. The user logs in by entering his or her username and password. JavaOS requests the Network Information System (NIS) 230 to verify the validity of the username and password, by connecting to NIS 230 over the local area network 204 and presenting the username and password for approval. If the username or password is incorrect or invalid, access to the system is denied. If they are correct or valid, then JavaOS requests the name of the user's home directory from an "auto.home" table mounted on the NIS server 230.

JavaOS is designed to execute a single application program. Accordingly, JavaOS next passes program control to the designated application program, such as Selector, and the host begins executing that application program. In the following description, as an example we describe operation of an embodiment of the invention in which Selector is the application program; however, any suitable application can be used.

Selector establishes an HTTP connection to the HTTP server 208 and requests the initial Web page identified by the URL contained in the boot image. Selector also requests a set of configuration files from the HTTP server 208. The HTTP server 208 responds by delivering the requested web page and files.

Selector can access a set of application programs 240, each of which is implemented as a Java applet stored in association with an HTML page on the HTTP server 208. Selector displays a main screen 402, shown in FIG. 4. Each application program 240 is represented in the main screen by an icon 404, 406 in the application icon pane 410 of the Selector main screen 402. Each icon is associated with a URL identifying the HTML page that contains the applet represented by the icon. For example, the mailbox icon 404 is associated with a URL identifying an HTML page on the HTTP server that contains a MailView applet. The MailView applet implements an electronic mail program. Thus, when a user clicks the mailbox icon 406, from HTTP server 208 Selector loads the HTML, page associated with the icon and which contains the MailView Java applet. The associated HTML page is loaded and graphically displayed in the display pane 420 of the main screen 402. The application icon pane 410 remains visible at all times. The applet loads itself into RAM of the host, and then executes and runs on the user's host.

Applications 240 may also be an HTML page without an applet, or a set of forms tied to Common Gateway Interface (CGI) scripts.

CONFIGURING APPLICATION PROGRAM PROPERTIES

The appearance and behavior of the user's host and the currently executing application are governed by configuration files or property lists. In one embodiment, the property lists are implemented as text files 214, 216, 220, 222 that reside on the HTTP server 208. A user property list 218 is stored on a logically remote file server 232. During the boot process, the remote file server 232 is mounted using the NFS protocol so that the file server 232 is accessible by to the local host such as NC 200. The user property list can be stored in a home directory exclusively assigned to a particular user and located on the NFS-mounted file server 232.

When the bootstrap loader program of the host is running, it receives from the JBS 206 a URL representing an initial Selector configuration file. For example, the URL may be:

http://webserver/jdt/props/selector.init where "webserver" refers to an HTTP server such as HTTP server 208. The file <selector.init> is used to rendezvous with the HTTP server where a set of properties lists are installed. For example, the <selector.init> file can contain a text string that specifies the HTTP server where properties files are installed, such as HTTP server 208. Selector establishes an HTTP connection to that server, and loads the properties files. These files are assumed to be in the same location as the <selector.init> file.

The term "properties" refers broadly to application program attributes, parameters, preferences, and environmental variables, e.g., any aspect of an application program that an end user may configure or adjust. Examples of properties are display fonts, the identity and location of external resources such as printers, servers, and other input/output devices, methods of alerting a user such as through an alarm or bell, window location and size, and language used by an application.

In one embodiment, the properties lists comprise a plurality of files. In this description, the terms "list" and "file" are used interchangeably to refer to property lists, because one way to implement list is a set of text strings stored in a file. However, property lists as described herein may be stored in any convenient form; use of files is not required. One file has a list of default properties. The second is a list of specific properties. The third is a list of final properties. As shown in FIG. 2, as an example, a default properties list 214 and two exemplary specific properties lists (host properties list 216, and application properties list 224) are each stored on a mass storage device 212 associated with the HTTP server 208. Another exemplary specific properties list, user properties list 218, is stored on a remote file server 232. The mass storage device 212 also stores a final system-wide properties list 220, a final host-specific properties list 222, and a final application-specific properties list 226.

One feature of this invention is a method enabling the system administrator to override certain user-selected properties with the assurance that neither the user nor any other individual can override the system administrator's property decisions. Accordingly, rules of precedence are used when the property files are loaded.

Figure 3:
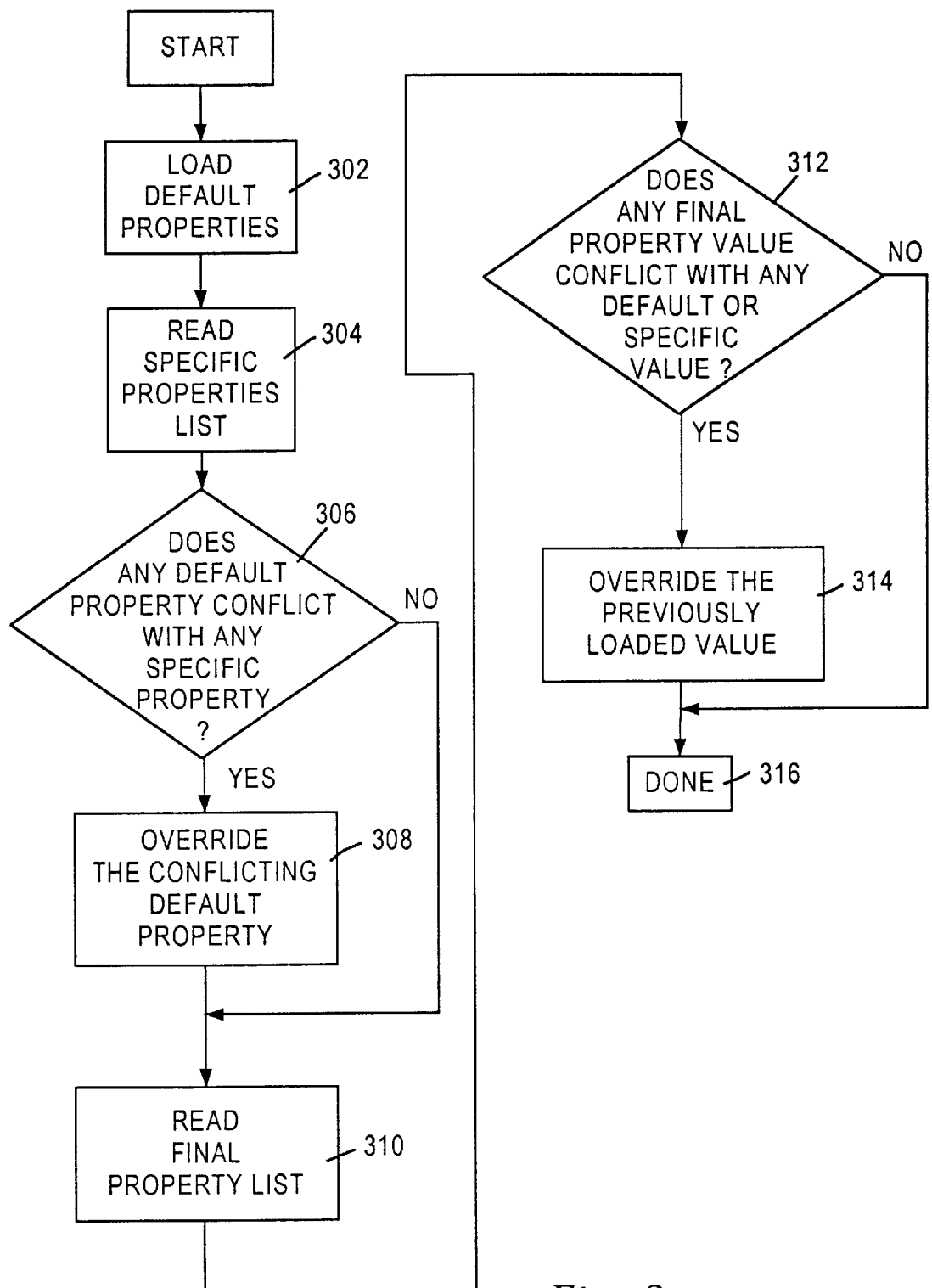
FIG. 3 is a flow diagram illustrating one aspect of the invention using default, specific and final property list files.

One aspect of the invention is a method shown in the flowchart of FIG. 3. As shown in step 302 of FIG. 3, when a computer program or process implementing the invention (for example, Selector or another application program calling methods in the JDTProperties class, described below) loads property files, it begins by loading a first list of default properties, such as the default properties list 214. The term "load" refers, by way of example, to reading a property list file and writing each property string found in the file to a merged property list. The merged property list can be stored in the RAM memory of the network computer on which Selector is running (such as NC 200), or in files on a mass storage device of a server such as the HTTP server 208 or JBS 206, or in the RAM memory of the server. The merged property list may be organized in any convenient data structure or data object which is accessible to and readable by the application programs 240. In one embodiment, the merged property list is maintained by a JDTProperties object, which is described in more detail below.

Next, as shown in step 304, a second list of specific properties is read, such as the host-specific properties file 216, the user properties list 218, or the application-specific properties list 224. As shown in step 306, as the specific property values are read, they are compared to the previously loaded default property list values. If any value in the default property list conflicts with a corresponding value in the specific properties list (for example, if both lists attempt to set a system font parameter to different values), then as shown in step 308, the conflicting default property list value is overridden with the corresponding specific property list value.

Thereafter, and if the test of step 306 is negative, control is passed to step 310 in which the final property list values are read. As shown in step 306, as the final property values are read, they are compared to all previously loaded default property list values and the specific list values. If any value in the final property list conflicts with a corresponding value in any previously loaded properties list, then as shown in step 314, the conflicting property list value is overridden with the corresponding final property list value.

The default property list and the final property list are prepared by a system administrator and stored in a location or manner which prevents a user from editing or changing the contents of the lists. The specific property list values may be defined or written by a user. In this way, the system administrator is assured that values in the final property list always override any conflicting values in the user-defined specific property list, and that the final property list values cannot be changed or overridden.

The specific property list may comprise a user properties list, a host-specific properties list, or an application-specific properties list. Each are discussed below.

Application-Specific Properties

In another embodiment, a property list is provided for property values that are application program-specific. That is, such property list files define properties for a particular application program which apply regardless of what host or user is executing the application program.

For example, the HTTP server can store an application-specific property list file 224 for Selector or another application. If the system administrator wishes to establish final properties for that application, the system administrator can prepare and store on the server a final application-specific property list file 226. The discussion below of Selector-specific property files is another example of using the invention to establish application program-specific properties, but property list files can be provided for particular application programs other than Selector. For example, in one embodiment, the server stores a file named/ props/<group>/<app>.props where <app> is the name of an application program. Such a file contains a list of properties governing the named application program, and such properties would apply to all users in the group <group>. In addition, stored in a user's home directory, there is a user-defined application-specific property list file called "$HOME/<app>.props" in which a particular user sets properties for a particular application <app>. There is a final application-specific property list file called "/props/<group>/<app>.final" which contains properties that override the user-defined application-specific properties. The pathname given for this final file is relative to the system install area.

Thus, the system administrator could establish certain application-specific properties in the <app>.final file with the assurance that the properties would override any conflicting application-specific properties set by a particular user.

Host-Specific Properties

One feature of the invention is providing a method for associating properties with particular hosts. In one embodiment, the HTTP server 208 stores a host-specific property list 216 and a final host-specific property list 222. These lists may be implemented as files entitled <props/ hosts.props> and <props/hosts.final>. In them, a user or system administrator may store values for host-specific properties, and final property values for a particular host which override conflicting previously loaded host-specific property values.

Each property value in such host-specific property lists is written with a prefix corresponding to the name of the host to which the property is associated. For example, to retain the typeface setting on a host named "nc1" regardless of what user is logged into it, a user or administrator may add this entry to the file <hosts.final>:

nc1.jdt.font=Helvetica

This would set the jdt.font property to Helvetica for machine nc1; any user's particular font setting could not override it. As shown in FIG. 4B, steps 380 to 388, properties in <hosts.final> override conflicting user properties. An exemplary host property list file is provided below in Table 1.

TABLE 1

Example Host Property List File

```
HotJava Views host specific properties file

This file defines properties that are specific to a particular host.
Properties in this file are in the form:
<hostname>.<propertyname>=<value>

(E.g. nc1.jdt.font=Helvetica)

When HotJava Views is run on a host the properties mechanism will
```

TABLE 1-continued

Example Host Property List File

```
read this file and normalize all properties that begin with the hostname.
(E.g. nc1.jdt.font=Helvetica will become jdt.font=Helvetica)

The domain name should not be included as part of the hostname.

nc1.jdt.font=Helvetica-bold-12
nc1.jdt.printers=color1,bw2
nc2.jdt.font=Helvetica-14
nc2.jdt.printers=bw2,lobby1
javastation1.jdt.font=Lucida-sans-12
javastation1.dex.resultSize=150
javastation1.mail.store.imap.host=mailserver2.eng
javastation1.mail.checknewmail.interval=15
kiosk3.cal.reminder.bell=false
```

All host-specific properties are stored in the <host.props> or <host.final.property> files. The method of the invention is configured to load only properties pre-pended with the name of the host on which the application or Selector is then currently executing. When host-specific property names and property values are read from the host-specific property list file 216, 222, each property name is normalized to remove the host name before the property name and value are merged with the merged property list. In the example above, "nc1," "nc2," and "javastation" would be stripped from each property name before merging the name and value with the merged property list. This ensures that later-loaded property values for the same property name will override the host-specific property values, and it precludes the need for a separate and later step to strip the host name from the property name.

Thus, only host-specific properties for the then-current host are loaded.

///
///
///

Group Properties

Another feature of the invention is the ability to organize users into groups, in combination with group property list files which establish the same properties for each user in a particular group. In one embodiment, when Selector starts, it first loads a file designated <props/jdt.group>. This file identifies groups, identifies which users are in each group, and determines which set of configuration files is to be loaded for each user. Unless explicitly assigned to another group, users are in the group named "default".

For example, suppose that users "jsmith" and "fjones" are in the engineering group (all other users are in the default group). The group file would contain the following:

```
props/jdt.groups
# Default group
jdt.default.group=default
# List of groups
jdt.groups=default|engineering
# Groups
jdt.group.jsmith=engineering
jdt.group.fjones=engineering
```

Each group has a corresponding sub-directory in the "props" directory. The name of the sub-directory is the name of the group. Thus, in this example, there are two directories: "default" and "engineering". Each directory contains a complete set of the property files identified above. However, using this type of group definition file, a system administrator can easily and rapidly apply pre-defined properties to large numbers of users without having to copy a set of special property definition files into each user's home directory. At the same time, if the system administrator is creating a new user group that has many of the same properties as a previously set-up group, the system administrator can easily "clone" the previous group into the new group by copying the existing property list files in the first group's sub-directory. Groups do not share property files.

Another exemplary group definition file is provided in Table 2 below.

TABLE 2

Sample Group Definition File

```
HotJava Views group definition file

The jdt.group file provides a way to assign users into groups. Members
of a group would inherit the same properties. To assign a user to a
group add a line of the form:
jdt.group.<login>=<groupname>

To place Joe Smith who has a login of jsmith into the engineering
group you would add the following line:
jdt.group.jsmith=engineering

A group name corresponds to a directory in /opt/SUNWjdt/lib/props
e.g. /opt/SUNWjdt/lib/props/engineering). That directory must contain
all the HotJava Views properties files. These property files can be
customized for the group.
If a user is not explicitly listed in a group then they are in the
default group defined by the jdt.default.group property.
jdt.default.group=default
jdt.groups=default|reciptionist|engineering
jdt.group.kasso=reciptionist
jdt.group.schneider=reciptionist
jdt.group.mjones=reciptionist
jdt.group.dipol=engineering
jdt.group.knutson=engineering
jdt.group.jffowler=engineering
```
In an alternative embodiment, hosts may also be placed in groups.
When group files are used, the "props" directory is organized
as shown in Table 3:
///
///
/// jdt.group.jffowler=engineering

In an alternative embodiment, hosts may also be placed in groups. When group files are used, the "props" directory is organized as shown in Table 3:

TABLE 3

Organization of "props" Directory

```
/opt/SUNWjdt/lib/props:
    hosts.props        [host-specific properties]
    jdt.group          [maps users to groups]
    hosts.final        [final host-specific properties]
    default
    <group1>
    <group2>
    *
    *
    <group n>
```

In Table 3, the labels, <group1>, <group2>, and <group n> each refer to a sub-directory having a name corresponding to a group, such as "engineering," or "marketing." Table 4 lists the property list files which are located in each such group sub-directory. The same files are found in the "default" sub-directory, which is a required sub-directory:

TABLE 4

Organization of Group Sub-Directory

/opt/SUNWjdt/lib/props/<group1>:
    jdt.props
    <app1>.props
    <app2>.props
    jdt.final
    <app1>.final
    <app2>.final where "<app1>" and "<app2>" are the names of particular application programs. Similarly, the home directory of a particular user would contain:

jdt.props
<appl>.props
<app2>.props

Using group definition lists and sub-directories of property lists associated with each group in this manner, in one embodiment, the invention can apply consistent properties to all members of the group. The group definition list comprises a group list of a plurality of user names logically organized in a user group. The property list files for the group comprise a list of property values for the user group. The files are stored in an area of a mass storage device associated with the user group, such as a subdirectory for the group. The process is configured to test whether a current user of the process is in the user group. If so, the process reads the property list files in that group's subdirectory, and merges property values found in those list files into the merged property list.

Managing and Configuring Properties From Multiple Sources

In one embodiment, property lists are used for default system-wide properties, host-specific properties, user-specific properties, default application-specific properties, user-specific properties for an application such as Selector, final system-wide properties, final host-specific properties, and final application-specific properties. In this embodiment, an application program such as Selector loads the property files identified in Table 5 below in the order given in Table 5. In Table 5, when the string <group> appears in a file name, it refers to a string identifying the user's group, as discussed further in the section entitled "Group Property Files," above. This indicates that a process of this embodiment will load the named file from the subdirectory associated with a particular group. Also, the directory pathnames beginning with "props" are relative pathnames, and are merely exemplary; other pathnames or file locations can be used. When the system operates in connection with an HTTP server, such pathnames are relative to the document root director of the HTTP server. When the system is configured to retrieve the files from an ordinary file server, the pathnames are relative to the installation directory on that file server.

TABLE 5

Property File Load Order 1. props/<group>/jdt.props: Default system properties, global to every application program (locale and fonts, for example).
2. props/hosts.props: Properties for specific hosts in the system; only property values for the host on which Selector is currently running are ultimately loaded.
3. $HOME/.jdt/props/jdt.props: User-specific properties, global to every component; these override the default system properties (item 1 above).
4. props/<group>/selector.props: Default system properties for Selector.
5. $HOME/.jdt/props/selector.props: User-specific properties for Selector; these override the default system properties for Selector (item 4 above).
6. props/<group>/props/jdt.final: Final shared system properties. Used by the System Administrator to enforce property settings. The end-user cannot override properties set by this file.
7. props/hosts.final: Final host properties list file. Used by the system administrator to enforce property settings for specific hosts; these override any previously loaded conflicting property value, including values in the host-specific properties list identified in item 2 above.
8. props/<group>/selector.final: Final Selector-specific properties list file. Used by the system administrator to enforce property settings for Selector; these override the Selector-specific properties identified in item 5 above.

This loading sequence provides the flexibility of assigning properties by user, group, and host. Each list overrides conflicting properties in all previously loaded lists. It also enables the System Administrator to enforce specific property settings by using the ".final" property files. It is logically arranged so that more general properties are loaded first, followed by properties for more specific facilities.

Figure 4A:
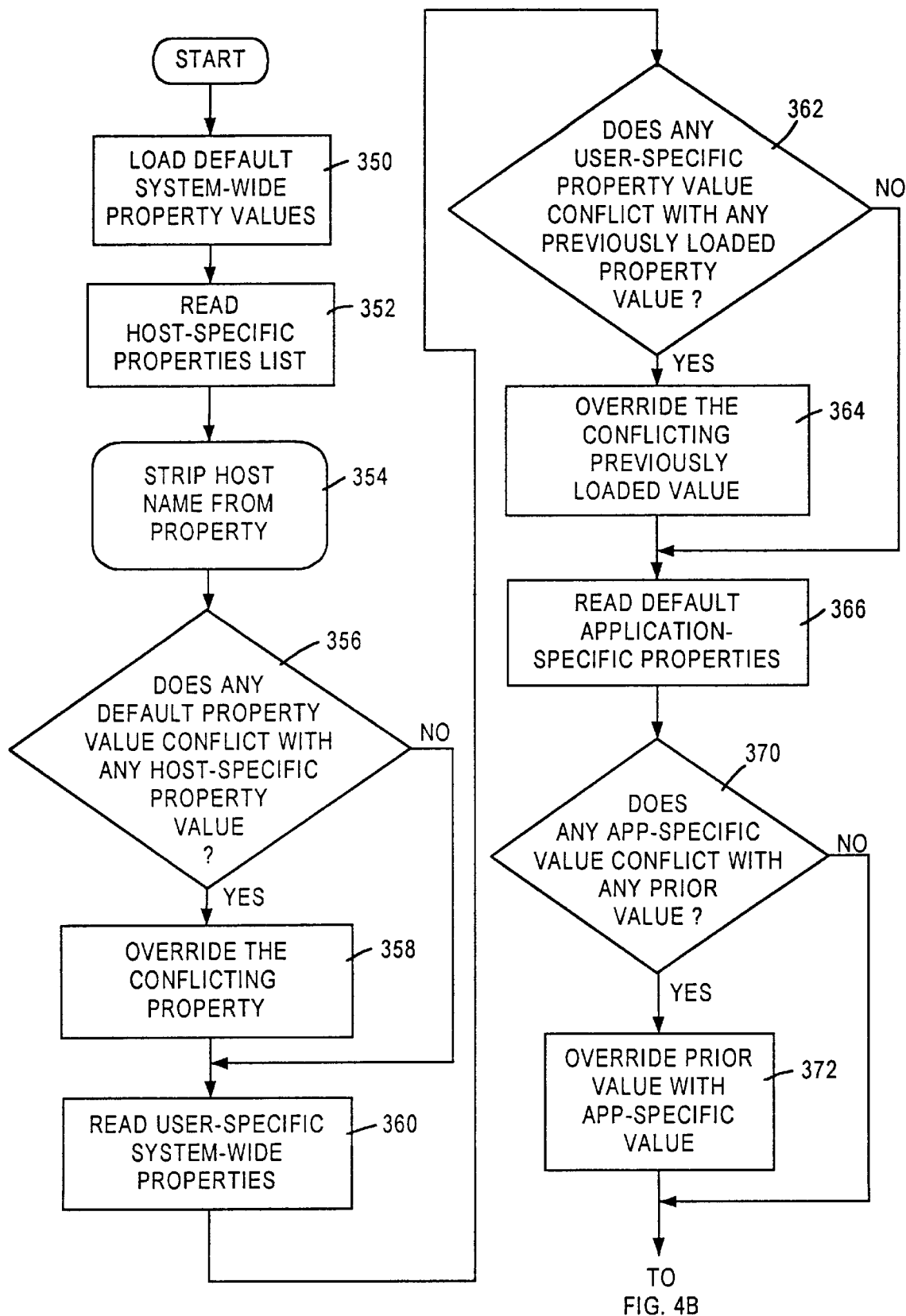
FIG. 4A and FIG. 4B are a flow diagram illustrating another aspect of the invention using multiple property list files.
Figure 4B:
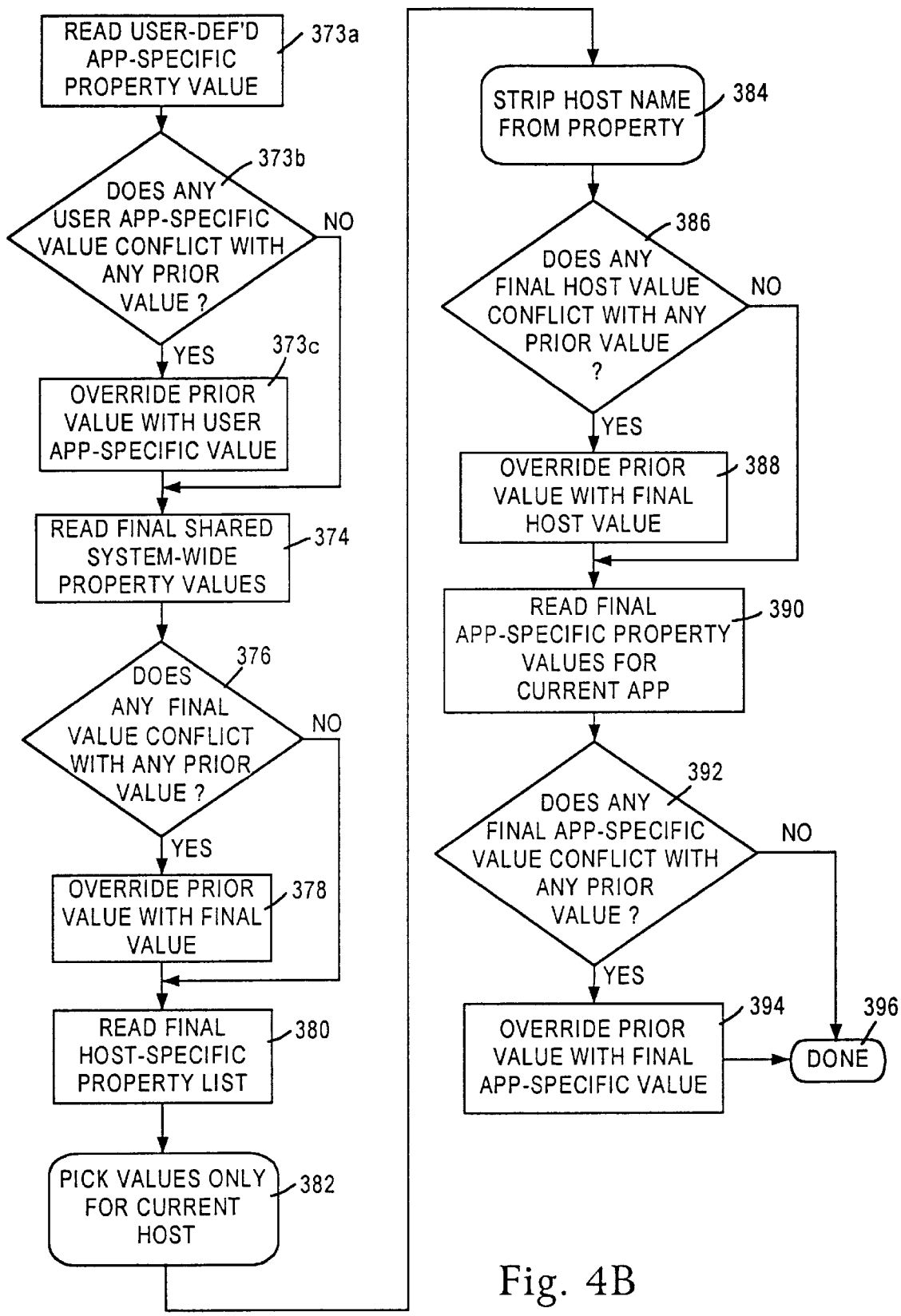
Figure 5:
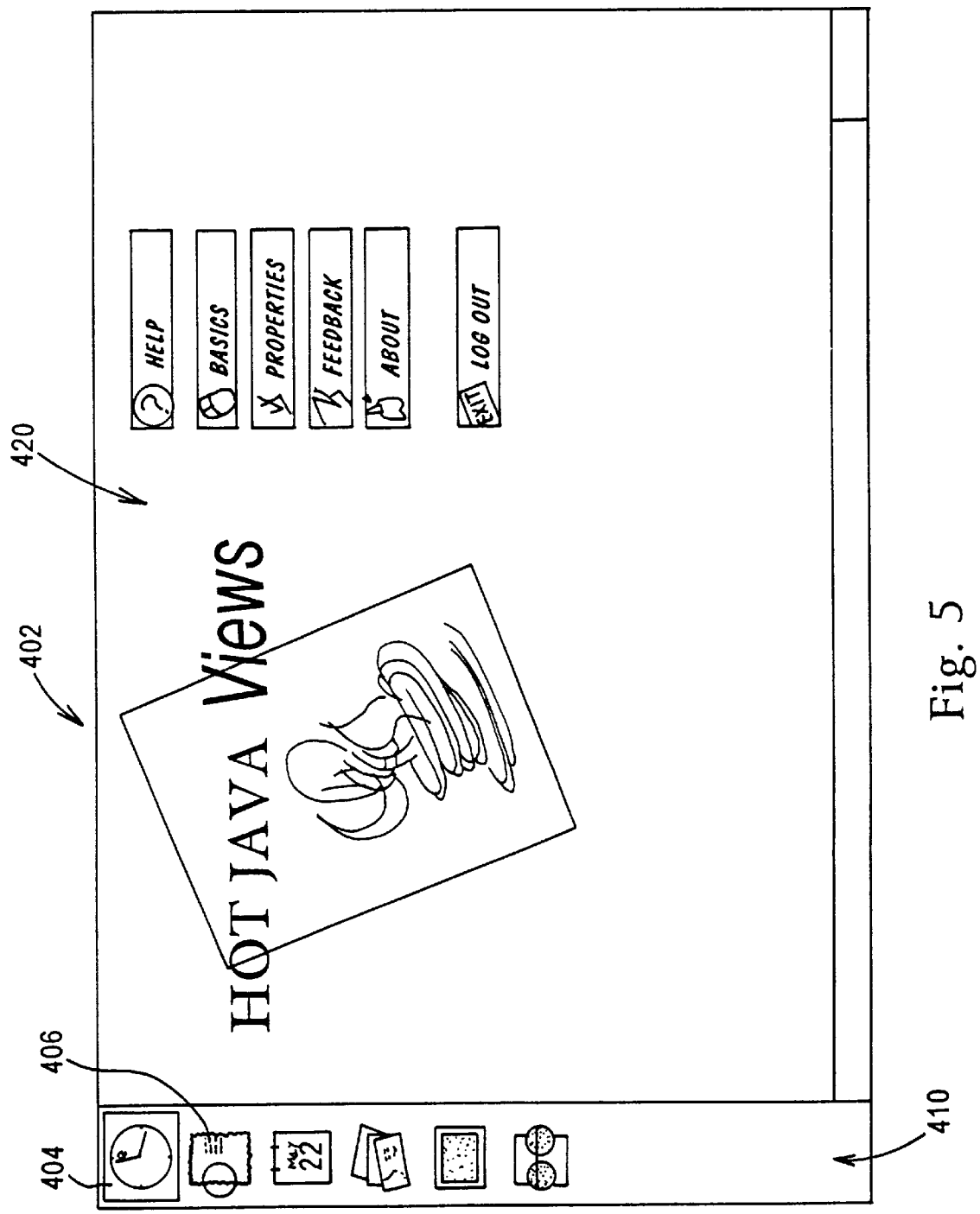
FIG. 5 is a diagram showing a screen displayed by one embodiment of the invention.

As shown in FIG. 4A and 4B, a process according to this embodiment loads default system-wide property values at step 350, such as the default property list file 214. The values in the file 214 are loaded into the merged property list stored in the memory of a host such as NC 200. In step 352, the process reads a list of host-specific property values, such as the host-specific property file 216. Step 352 includes the sub-step of testing whether each property name identified in the host-specific properties file 216 matches the name of the host then currently executing the process. According to one embodiment, host-specific properties have a prefix which identifies the host to which they apply, and a process operating according to this embodiment is configured to load only values for properties containing, associated with, or pre-pended with the name of the host on which the process is then currently executing. As shown in step 354, for such property values, the pre-pended host name is stripped and the values are then written into the merged list.

One rule of precedence is that host-specific property values override conflicting default property values. Thus, in step 356, the process tests whether any values in the host-specific property file 216 conflict with values previously loaded from the default property file 214. If so, the process overrides such conflicting property values by substituting a value from the host-specific property file 216. The term "override" means overwriting or replacing the conflicting earlier loaded property value in the merged property list.

The user-specific properties list file 218 is loaded, as shown in step 360. Another rule of precedence is that user-defined properties may override either default or host-specific properties. Therefore, in step 362, to carry out the overriding, the process tests whether any previously loaded property value conflicts with any user-created property in the user properties list file 218. If the test of step 362 is affirmative, in step 364 the process overrides the conflicting previously loaded value by substituting the corresponding user-defined property value.

Thereafter, and if the test of step 362 is negative, control is passed to step 366 in which the process loads a list of default property values for the particular application program then running on the host. This list may be the application-specific property list file 224 stored on the HTTP server 208. If the server contains files for applications other than the currently executing application program, the process ignores them; the property filename must include the current application name. As property values are read, the process tests whether any of the application-specific values conflict with any previously loaded value, as shown in step 370. If so, the conflicting prior value is overridden by the corresponding value in the application-specific file 224, as shown in step 372.

In step 373a, the process reads application-specific property values from a user-created list, such as the file <$HOME/jdt/props/selector.props> identified in Table 5, item 5. This file generally contains property values for a particular application, such as Selector, which the user desires to set. In step 373b the process tests whether any values in the user-defined application-specific property list conflict with any previously loaded values. If so, in step 373c the process overrides such conflicting values with those in the file.

In step 374, the process reads final shared system-wide property values, such as the final system-wide properties list file 220. Another rule of precedence is that properties in properties lists designated "final" shall override any conflicting earlier loaded property value, and such final properties may not be over-ridden by any user-selected property value. By following this rule, the process enables the system administrator to establish policies and properties with the assurance that a user cannot override them. Accordingly, in step 376 the process tests whether any previously loaded property value conflicts with any property value in the final system property list file 220. If so, control passes to step 378 in which the process overrides the conflicting user property by over-writing it. Thereafter, and if the test of step 376 is negative, control is passed to step 380.

In step 380, the process loads a final host-specific property list file 222. In step 382, the process selects only those property values that match the host currently executing the process. In step 384 the pre-pended host name is stripped from the property name before its value is added to the merged property list. Properties in the final host-specific property list override any conflicting properties in the host-specific properties list file 216, and a user may not override such final properties. Accordingly, in step 386 the process tests whether any previously loaded value conflicts with any final host-specific property in the file 222. If so, control is passed to step 388 in which the process overrides the conflicting value by substituting the corresponding property value from the file 222.

Thereafter, and if the test of step 388 is negative, control is passed to step 390. In step 390 the process reads final application-specific property values from a list such as the final application-specific property list file 226. Values in the file 226 override any conflicting previously loaded value. Therefore, in step 392 the process tests whether any value in the file 226 conflicts with any previously loaded value. If so, in step 394 the process overrides such conflicting values with values from file 226. Control is then passed to step 396, at which point the property file load sequence is complete.

Thus, the rules of precedence assure the system administrator of ultimate control over the property setting process.

The foregoing rules of precedence are exemplary and are not limiting; other rules of precedence may be established and implemented.

MERGED PROPERTY LIST

The property list files are loaded both when Selector initializes and each time any other NC application starts, is loaded, or is invoked. When Selector initializes and the property list files are loaded, Selector builds a merged property list in the memory of the host that is executing Selector, for example, in the process memory space of the application currently executing in the host.

However, to reduce the amount of data transmitted over the local area network, and to preserve the integrity of property values configured by the system administrator, the merged property list is not written to a server mass storage device. Instead, if a user changes property values after the merged property list is constructed, the file <<app>.props> in the user's home directory (where "<app>" refers to the particular application then in use) is updated and overwritten with changed property values for only those properties which were earlier loaded from that user's home directory, and for any new properties or values created by the application which was used to change the property values. For example, in the embodiment previously discussed with reference to Table 5, in which Selector is the application program, the process would update the file <selector.props> only with changes to properties listed in the property lists pre-pended with the designation "$HOME" (which translates into the user's home directory path in most UNIX-based operating systems).

In one embodiment, the JDTProperties object maintains both a merged property list and a second list comprising only those properties loaded from files in the user's home directory. To prevent corruption of its data by application programs, the second list is not externally accessible to programmers through the JDTProperties API. When changes are made to properties in the second list, both the second list and the merged property list are updated, but only the second list is written to the <<app>.props> file in the user's home directory.

Thus, the entire merged property list is not written to the user's home directory or anywhere else. This process is followed to avoid over-writing property values established by the system administrator with user-specified values, and to reduce the amount of data transmitted over the network. The organization of user home directories including the file <<app>.props> is described in more detail below.

SYNTAX AND FORMAT OF PROPERTY FILES

In one embodiment, properties list files contain text adhering to the syntax defined by the java.util.Properties class. The java.util.Properties class is a standard Java language object class definition. The Java language is an object-oriented programming language which is well known in the art. It is described in detail in "The Java™ Language Specification," by James Gosling, Bill Joy and Guy Steele (Sun Microsystems, Inc.: Addison-Wesley Publishing Co.), and related texts in the Java Series published by Addison-Wesley.

In one embodiment, the java.util.Properties class is sub-classed and extended with additional method definitions to form a new class called JDTProperties which implements the invention. The JDTProperties class is implemented in the Java source language to carry out the steps of the invention. The JDTProperties class is a public class, and is an adaptive class that can be instantiated from a Java applet and an application in both restrictive and unrestrictive environments. A JDTPropertiesException class is also defined to signal that an exception has occurred related to a JDTProperties operation. The JDTPropertiesException class is subclassed from the java.lang.Exception class which forms a standard part of the Java language definition. A public interface JDTPropertiesStatus is also defined to establish error codes for the JDTPropertiesException class. The attached Appendix provides an application program interface for the above-identified classes and interface in detail sufficient to permit one of ordinary skill in this art to write computer program source code to implement the classes and interface. The attached Appendix is intended to form part of this patent disclosure and is hereby incorporated by reference as if fully set forth herein.

APPLYING PROPERTIES TO APPLICATIONS

Once the merged property list has been constructed using the foregoing method, the properties represented in the merged property list are communicated to the application programs 240 to cause the application programs 240 to appear and behave as designated by the properties.

In one embodiment, the merged list of properties is stored in an instance of the JDTProperties object defined herein, and properties are communicated to an application program 240 by sending a message from the JDTProperties object to the application. Alternatively, the application program 240 may instantiate the JDTProperties object, call the "load" method to cause JDTProperties to build a property list, and send a message to the JDTProperties object requesting such object to reply with the name of any properties pertaining to the then-executing application program. This can be done by calling the "propertyName" method of JDTProperties (which returns a list of property names), followed by calling the "getProperty" method for each named property. The functions and parameters of these methods are summarized in the Appendix.

In another embodiment, the merged property list is stored in a look-up table in a centralized, pre-determined location accessible to any application program. The application program reads the look-up table and scans it for properties that pertain to the application program.

The invention as described herein is flexible and powerful. It enables application attributes or properties to be established for particular users, hosts, and groups with which users are associated. The invention is flexible as it allows the user to override properties on a system-wide basis, affecting all applications used by the user, or on only particular applications. It also allows a system administrator to override user properties on a system, group or host-wide basis.

The invention permits a system administrator to organize users into groups from which properties are inherited, but allows properties to be assigned on a host-specific basis and over-ridden by individual users. For example, a system administrator can place all receptionists into one group. The system administrator could specify a single mail server to be used by all receptionists regardless of which host they are using. Further, the administrator could specify that a printer is associated with a particular host so that any user logging into that host always directs hard copy output to the designated printer. Concurrently the user could specify a particular type-font for their e-mail application that would follow the user from one host to the next, but would be different from all the other users in the receptionist group.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

— APPENDIX — 08/829891

All Packages  Class Hierarchy  This Package  Previous  Next  Index

Class sunw.jdt.util.props.JDTProperties

```
java.lang.Object
   |
   +----java.util.Dictionary
           |
           +----java.util.Hashtable
                   |
                   +----java.util.Properties
                           |
                           +----sunw.jdt.util.props.JDTProperties
``` public class JDTProperties
extends Properties

An extension of java.util.properties that supports methods for retrieving property data from the JDT environemnt. This is an adaptive class that handles being instantiated from an applet and an application in both a restrictive and unretrictive environment. Depending on the context, functionality - such as reading user properties may or may not be available.

Constructor Index

- JDTProperties()
    Construct a new JDTProperties.
- JDTProperties(String)
    Construct a new JDTProperties.
- JDTProperties(String, Applet)
    Construct a new JDTProperties.
- JDTProperties(String, String, String)
    Construct a new JDTProperties.
- JDTProperties(String, URL, URL)
    Construct a new JDTProperties.

Method Index

- _constructUserPropertiesPath(Applet)
- _constructUserPropertiesPath(URL)
- clear()
    clears the property object so that there are no more elements in it.
- load()

Load the system and user properties.
- load(boolean)
    Load the system and user properties.
- remove(Object)
    removes a property on the JDTProperties object that is marked to be saved.
- setPropertiesDefaults(Properties)
    Set the property's defaults for this JDTProperties object.
- setPropertiesInfo(String, Applet)
    Sets the name of the application and applet context to use.
- setPropertiesInfo(String, URL, URL)
    Sets the name of the application and the system and user urls to look for properties in.
- userPut(Object, Object)
    Puts a property back onto the JDTProperties object that is marked to be saved when the save method is called.
- userSave()
    Save properties that have been put back to the JDTProperties object using the userPut() method.

Constructors

● JDTProperties

```
public JDTProperties()
```

Construct a new JDTProperties. This constructor should be used if you are instaintiating the object via the Class.forName().newInstance() method.

● JDTProperties

```
public JDTProperties(String name)
```

Construct a new JDTProperties. This constructor should be used if you are an applicaton.
Parameters:
    name - The name of the application. be loaded along with the other property files.

● JDTProperties

```
public JDTProperties(String name,
                     URL sys_base_dir,
                     URL user_property_dir)
```

Construct a new JDTProperties. This constructor should be used if you are an applicaton.
Parameters:
    name - The name of the application.
    sys_base_dir - A URL to a directory of the application's doc base.
    user_property_dir - A URL to a directory which contains user properties.

● JDTProperties

```
public JDTProperties(String name,
                     String sys_base_dir,
                     String user_property_dir)
```

Construct a new JDTProperties. This constructor should be used if you are an applicaton.
Parameters:
    name - The name of the application.
    sys_base_dir - A url to a directory of the application's doc base. Must end with "/".
    user_property_dir - A url to a directory which contains user properties.

● JDTProperties

```
public JDTProperties(String name,
                     Applet applet)
```

Construct a new JDTProperties. This constructor should be used if you are an applet.
Parameters:
    name - The name of the application.
    applet - Your Applet class.

Methods

● setPropertiesDefaults

```
public void setPropertiesDefaults(Properties defaults)
```

Set the property's defaults for this JDTProperties object.
Parameters:
    defaults - A property list which contains default values for any keys not found in this property object.

● setPropertiesInfo

```
public void setPropertiesInfo(String name,
                              Applet applet)
```

Sets the name of the application and applet context to use.
Parameters:
    name - The name of the application.
    applet - Your Applet class.

● setPropertiesInfo

```
public void setPropertiesInfo(String name,
                              URL sys_base_dir,
                              URL user_property_dir)
```

Sets the name of the application and the system and user urls to look for properties in.
Parameters:
    name - The name of the application.

sys_base_dir - A URL to a directory of the application's doc base.
user_property_dir - A URL to a directory which contains user properties.

● load

```
public synchronized void load(boolean load_state)
```

Load the system and user properties.
Parameters:
    load_state - This parameter is no longer used.

● load

```
public synchronized void load()
```

Load the system and user properties.

● userPut

```
public synchronized Object userPut(Object property,
                                   Object value) throws NullPointerException
```

Puts a property back onto the JDTProperties object that is marked to be saved when the save method is called.
Parameters:
    property - The name of the property to be put.
    value - The value of the property to be put.
Returns:
    s the old value of the property, or null if it did not have one ● remove

```
public synchronized Object remove(Object property)
``` removes a property on the JDTProperties object that is marked to be saved.
Parameters:
    property - The name of the property to be removed.
Returns:
    s the old value of the property, or null if it did not have one
Overrides:
    remove in class Hashtable ● clear

```
public synchronized void clear()
``` clears the property object so that there are no more elements in it.
Overrides:
    clear in class Hashtable ● userSave

`public synchronized void userSave() throws JDTPropertiesException`

Save properties that have been put back to the JDTProperties object using the userPut() method. These properties are saved back to the user's home directory: ~/.jdt/props/props.

● _constructUserPropertiesPath

`protected static URL[] _constructUserPropertiesPath(Applet applet)`

● _constructUserPropertiesPath

`protected static URL[] _constructUserPropertiesPath(URL user_props)`

---

All Packages  Class Hierarchy  This Package  Previous  Next  Index

All Packages   Class Hierarchy   This Package   Previous   Next   Index

Class sunw.jdt.util.props.JDTPropertiesException

```
java.lang.Object
   |
   +----java.lang.Throwable
           |
           +----java.lang.Exception
                   |
                   +----sunw.jdt.util.props.JDTPropertiesException
``` public class JDTPropertiesException
extends Exception
implements JDTPropertiesStatus Signals that an exception has occurred related to a JDTProperties operation.

Constructor Index

- JDTPropertiesException(int)
    Construct a JDTPropertiesException with the specified error code.
- JDTPropertiesException(int, String)
    Construct a JDTPropertiesException with the specified error code and detail message.

Method Index

- getStatus()
    Retrieve the error code for this exception.

Constructors

● JDTPropertiesException

```
public JDTPropertiesException(int status)
```

Construct a JDTPropertiesException with the specified error code.

● JDTPropertiesException

```
public JDTPropertiesException(int status,
                              String message)
```

Construct a JDTPropertiesException with the specified error code and detail message. A detail message is a String that describes this particular exception.

Methods

● getStatus

```
public int getStatus()
```

Retrieve the error code for this exception. The error code will indicate what type of error has occurred.

---

All Packages   Class Hierarchy   This Package   Previous   Next   Index

All Packages   Class Hierarchy   This Package   Previous   Next   Index

Interface sunw.jdt.util.props.JDTPropertiesStatus public interface JDTPropertiesStatus
extends Object JDTPropertiesStatus defines error codes for the JDTPropertiesException class.

See Also:
   JDTPropertiesException

Variable Index

- IO
    Input/Ouput Error.
- NOSUCHFILE
    File not found
- NOTADIRECTORY
    Object is not a directory
- NOTAFILE
    Object is not a file
- NOTWRITABLE
    File not writable
- NULLFILENAME
    A null filename was used.
- PROPSDIR
    Cannot find property directory to write state in.
- SECURITYEXCEPTION
    Unable to write to property directory due to security restriction.
- UNKNOWN
    An unknown error has occurred.

Variables

● IO

```
public final static int IO
```

Input/Ouput Error.

● NOTWRITABLE public final static int NOTWRITABLE

File not writable

● NOTAFILE public final static int NOTAFILE

Object is not a file

● NOTADIRECTORY public final static int NOTADIRECTORY

Object is not a directory

● NOSUCHFILE public final static int NOSUCHFILE

File not found

● PROPSDIR public final static int PROPSDIR

Cannot find property directory to write state in.

● SECURITYEXCEPTION public final static int SECURITYEXCEPTION

Unable to write to property directory due to security restriction.

● NULLFILENAME public final static int NULLFILENAME

A null filename was used.

● UNKNOWN public final static int UNKNOWN

An unknown error has occurred.

What is claimed is:

1. A method for managing properties of an application program, the method comprising the steps of:
   (a) when the application program is invoked by a user, loading first, second, and third lists of application program property values into a merged property list;
   (b) if one of the first list's values conflicts with one of the second list's values, overriding the conflicting first list value with the second list value in the merged property list;
   (c.) if one of the second list's values conflicts with one of the third list's values, overriding the conflicting second list value with the third list value in the merged property list; and
   (d.) configuring the application program by communicating the merged property list to the application program.

2. The method recited in claim 1, further comprising the step of writing the first, second and third lists on a mass storage device in association with the application program.

3. The method recited in claim 1, further comprising the step of loading the first, second, and third lists in an order that corresponds to the precedence of the properties contained therein.

4. The method recited in claim 1, wherein the merged list is stored in a host on which the application program is running.

5. The method of claim 1, further comprising the steps of:
   writing at least one group list of a plurality of user names logically organized in a user group;
   writing a fourth list of property values for said user group in an area of a mass storage device associated with said user group;
   testing whether a current user is in the user group, and if so, merging said fourth list into said merged property list.

6. The method of claim 1, further comprising the step of enabling only the second list to be modified by the user.

7. The method of claim 1, further comprising the step of executing the application program on a host comprising only volatile memory storage.

8. The method of claim 7, further comprising the steps of storing the first, second, third and merged property lists on a mass storage device, and communicating the merged property list from the mass storage device to the host.

9. The method of claim 1, wherein step (b) further comprises the step of:
   (b1) loading a fourth list comprising host-specific property values for a host executing the application program into the merged property list, and wherein step (d) further comprises the step of:
      (d1) if one of the second list's values conflicts with one of the fourth list's values, overriding the conflicting second list value with the fourth list value in the merged property list.

10. The method of claim 9, wherein step (b1) further comprises the step of normalizing the host-specific property values.

11. The method of claim 1, further comprising the steps of:
    storing a second merged property list in a memory;
    reading property values from one of said first, second, and third lists;
    merging said property values into said second merged property list only if said one of said first, second and third lists has been read from a mass storage device from a storage area associated with a user; and
    writing said second merged property list to said storage area when said second merged property list is changed.

12. The method of claim 1, wherein step (b) further comprises the step of:
    (b1) loading a fifth list comprising application-program-specific property values for the application program, and wherein step (d) further comprises the step of
    (d1) if one of the fifth list's values conflicts with one of the first list's values, overriding the conflicting first list value with fifth list value in the merged property list.

13. The method of claim 10, further including the steps of:
    (d2) loading a sixth list comprising final application-program-specific properties for the application program; and
    (d3) if one of the sixth list's values conflicts with one of the fifth list's values, overriding the conflicting fifth list value with the sixth list value in the merged property list.

14. A method for managing application properties of an application program, the method comprising the computer-implemented steps of:
    (a) writing on the mass storage device, a default property list comprising default property values, a user property list comprising user property values, and a final property list comprising final property values;
    (b) when the program is invoked, loading the default property list, the user property list, and the final property list into a merged property list stored in a host;
    (c.) if one of the default property values conflicts with one of the user property values, overriding the conflicting default property value with the user property value in the merged property list;
    (d) if one of the user property values conflicts with one of the final property values, overriding the conflicting user property value with the final property value in the merged property list; and
    (e) configuring an application property of the program using the merged property list.

15. The method of claim 14, further comprising the steps of:
    writing at least one group list of a plurality of user names logically organized in a user group;
    writing a group property value list for said user group in an area of a mass storage device associated with said user group;
    testing whether a current user is in the user group, and if so, merging said group property value list into said merged property list.

16. The method of claim 14, wherein step (b) further comprises the step of
    (b1) loading a fourth list comprising host-specific property values for a host into the merged property list, and wherein step (d) further comprises the step of
    (d1) if one of the user property list values conflicts with one of the host property list values, overriding the conflicting user property list value with the host property list value in the merged property list.

17. The method of claim 14, further comprising the steps of:
    storing a second merged property list in a memory;
    reading property values from one of said default property list, user property list, and final property list;
    merging said property values into said second merged property list only if said one of said default property list, user property list, and final property list has been read from a mass storage device from a storage area associated with a user; and writing said second merged property list to said storage area when said second merged property list is changed.

18. A method for managing properties of an application program, the method comprising the steps of:
(a) loading first, second, and third lists of application program property values into a merged property list;
(b) if one of the first list's values conflicts with one of the second list's values, overriding the conflicting first list value with the second list value in the merged property list;
(c.) loading a fourth list of application program property values into the merged property list;
(d) if one of the fourth list's values conflicts with one of the third list's values, overriding the conflicting third list value with the fourth list value in the merged property list;
(e) loading a fifth list of application program property values into the merged property list;
(f) if one of the fifth list's values conflicts with one of the second list's values, overriding the conflicting second list value with the fifth list value in the merged property list; and
(g) configuring the application program by communicating the merged property list to the application program.

19. A computer system comprising:
a processor; and
a memory coupled to said processor; the memory having stored therein first, second, and third lists of application program property values; and
sequences of instructions which, when executed by said processor, cause said processor to manage and configure application program properties by causing the processor to perform the steps of:
loading said first, second, and third lists into a merged property list;
overriding a conflicting first list value with a second list value in the merged property list if the first list value conflicts with the second list value;
overriding the conflicting second list value with a third list value in the merged property list if the second list value conflicts with the third list value; and
configuring the application program by communicating the merged property list to the application program.

20. The system recited in claim 19, wherein the first list comprises default application program property values.

21. The system recited in claim 19, wherein the second list comprises user-defined application program property values.

22. The system recited in claim 19, wherein the third list comprises final application program property values defined by an authority, and wherein the memory further comprises instructions causing the processor to perform the step of ensuring that the third list may not be overridden.

23. The system recited in claim 19, wherein the first, second and third lists are stored on a mass storage device in association with the application program.

24. The system recited in claim 19, wherein the memory further comprises instructions which cause the processor to perform the step of loading the first, second, and third lists in an order governed by rules of precedence.

25. The system recited in claim 19, wherein the merged list is stored in a host on which the application program is running.

26. The system recited in claim 19, wherein the memory has stored therein
at least one group list of a plurality of user names logically organized in a user group and
a group property value list for said user group in an area of a mass storage device associated with said user group;
and wherein the memory has stored therein instructions which cause the processor to perform the step of testing whether a current user is in the user group, and if so, merging said group property value list into said merged property list.

27. The system recited in claim 19, wherein the memory further comprises a sequence of instructions which cause the processor to perform the step of enabling only the second list to be modified by the user.

28. The system recited in claim 19, wherein the application program executes on a host having only volatile memory storage.

29. The system recited in claim 19, wherein the memory further comprises instructions causing the processor to perform the step of:
storing the first, second, third and merged property lists on a mass storage device logically remote from the processor; and
communicating the merged property list from the mass storage device to the processor.

30. The system recited in claim 19, wherein the memory further comprises instructions causing the processor to perform the steps of:
loading a fourth list comprising host-specific properties for a host executing the application program into the merged property list; and
overriding a conflicting user property with a host property in the merged property list if the user property conflicts with the host property.

31. The system recited in claim 19, wherein the memory further comprises a sequence of instructions causing the processor to perform the steps of:
loading a fifth list comprising application-program-specific property values for the application program into the merged list; and
overriding a conflicting default property value with an application-program-specific property value in the merged property list if the application-program-specific property conflicts with the default property.

32. The system recited in claim 19, wherein the memory further comprises instructions causing the processor to perform the step of:
loading a sixth list comprising final application-program-specific property values for a then-executing application program; and
overriding a conflicting application program specific property with a final application program specific property value in the merged property list if the final application-program-specific property value conflicts with the application program specific property value.

33. The system recited in claim 19, wherein the memory further comprises instructions causing the processor to perform the steps of:
storing a second merged property list in a memory;
reading property values from one of said first, second, and third lists;
merging said property values into said second merged property list only if said one of said first, second and third lists has been read from a mass storage device from a storage area associated with a user; and writing said second merged property list to said storage area when said second merged property list is changed.

34. A computer software product that includes a medium readable by a processor, the medium having stored thereon first, second, and third lists of application program property values; and a sequence of instructions which, when executed by said processor, causes said processor to manage properties of an application program by causing said processor to execute the steps of:

loading first, second, and third lists of application program property values into a merged property list;

if one of the first list's values conflicts with one of the second list's values, overriding the conflicting first list value with the second list value in the merged property list;

loading a fourth list of application program property values into the merged property list;

if any one of the fourth list's values conflicts with one of the third list's values, overriding the conflicting third list value with the fourth list value in the merged property list;

loading a fifth list of application program property values into the merged property list;

if any one of the fifth list's values conflicts with one of the second list's values, overriding the conflicting second list value with the fifth list value in the merged property list; and configuring the application program by communicating the merged property list to the application program.

35. The computer software product recited in claim 34, further comprising instructions which, when executed by said processor, causes said processor to manage properties of an application program by causing said processor to execute the steps of:

storing a second merged property list in a memory;

reading property values from one of said first, second, and third lists;

merging said property values into said second merged property list only if said one of said first, second and third lists has been read from a mass storage device from a storage area associated with a user; and writing said second merged property list to said storage area when said second merged property list is changed.

36. A computer software product that includes a medium readable by a processor, the medium having stored thereon first, second, and third lists of application program property values; and a sequence of instructions which, when executed by said processor, causes said processor to manage and configure properties of an application program by causing said processor to execute the steps of:

(a) loading the first, second, and third lists of application program property values into a merged property list;

(b) if one of the first list's values conflicts with one of the second list's values, overriding the conflicting first list value with the second list value in the merged property list;

(c.) if one of the second list values conflicts with one of the third list values, overriding the conflicting second list value with the third list value in the merged property list; and (d) configuring the application program by communicating the merged property list to the application program.

37. The software product recited in claim 36, further comprising instructions stored thereon which, when executed by said processor, cause said processor to execute the steps of writing the first, second and third lists on a mass storage device in association with the application program.

38. The software product recited in claim 36, further comprising instructions stored thereon which, when executed by said processor, cause said processor to execute the steps of loading the first, second, and third lists in an order that corresponds to the precedence of the properties contained therein.

39. The software product recited in claim 36, further comprising instructions stored thereon which, when executed by said processor, cause said processor to execute the steps of storing the merged list in a host on which the application program is running.

40. The software product recited in claim 36, further comprising instructions stored thereon which, when executed by said processor, cause said processor to execute the steps of:

writing at least one group list of a plurality of user names logically organized in a user group;

writing a group property value list for said user group in an area of a mass storage device associated with said user group;

testing whether a current user is in the user group, and if so, merging said group property value list into said merged property list.

41. The software product recited in claim 36, further comprising instructions stored thereon which, when executed by said processor, cause said processor to execute the steps of enabling only the second list to be modified by the user.

42. The software product recited in claim 36, further comprising instructions stored thereon which, when executed by said processor, cause said processor to execute the steps of executing the application program on a host comprising only volatile memory storage.

43. The software product recited in claim 36, further comprising instructions stored thereon which, when executed by said processor, cause said processor to execute the steps of storing the first, second, third and merged property lists on a mass storage device logically remote from the processor, and communicating the merged property list from the mass storage device to the processor.

44. The software product recited in claim 36, further comprising instructions stored thereon which, when executed by said processor, cause said processor to execute the steps of:

loading a fourth list comprising host-specific properties for a host executing the application program into the merged property list, if one of the user properties conflicts with one of the host properties, overriding the conflicting user property with the host property in the merged property list.

45. The software product recited in claim 36, further comprising instructions stored thereon which, when executed by said processor, cause said processor to execute the steps of:

loading a fifth list comprising application-program-specific properties for the application program, if one of the application-program-specific properties conflicts with one of the default properties, overriding the conflicting default property with the application-program-specific property in the merged property list.

46. The software product recited in claim 36, further comprising instructions stored thereon which, when executed by said processor, cause said processor to execute the steps of:

loading a sixth list comprising final application-program-specific properties for a then-executing application program; and if one of the final application-program-specific properties conflicts with one of the application program specific properties, overriding the conflicting application program specific property with the final application program specific property in the merged property list.

47. A computer system comprising:

a processor; and a memory coupled to said processor; the memory having stored therein first, second, and third lists of application program property values; and sequences of instructions which, when executed by said processor, cause said processor to manage and configure application program properties by causing the processor to perform the steps of:

loading the first, second, and third lists into a merged property list;

overriding a conflicting first list value with a second list value in the merged property list if the first list values conflicts with the second list value;

loading a fourth list of application program property values into the merged property list;

overriding a conflicting third list value with a fourth list value in the merged property list if the fourth list value conflicts with the third list value;

loading a fifth list of application program property values into the merged property list;

overriding the conflicting second list value with a fifth list value in the merged property list if the fifth list value conflicts with the second list value; and configuring the application program by communicating the merged property list to the application program.

* * * * *